United States Patent
Jun et al.

(10) Patent No.: US 8,396,138 B2
(45) Date of Patent: Mar. 12, 2013

(54) SYSTEM AND METHOD FOR CONTROLLING WIRELESS NETWORK ACCESS INFORMATION IN USING REMOVABLE EXTERNAL MODEM

(75) Inventors: Hae-Young Jun, Anyang-si (KR); Jai-Dong Kim, Yongin-si (KR); Eun-Tae Won, Seoul (KR); Wuk Kim, Gwacheon-si (KR); Ji-Cheol Lee, Yongin-si (KR); Ji-Eun Keum, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 440 days.

(21) Appl. No.: 12/602,450

(22) PCT Filed: Jun. 9, 2008

(86) PCT No.: PCT/KR2008/003207
§ 371 (c)(1),
(2), (4) Date: Jun. 7, 2010

(87) PCT Pub. No.: WO2008/150145
PCT Pub. Date: Dec. 11, 2008

(65) Prior Publication Data
US 2010/0238988 A1    Sep. 23, 2010

(30) Foreign Application Priority Data
Jun. 8, 2007 (KR) .................. 10-2007-0056344

(51) Int. Cl.
*H04L 27/00* (2006.01)
(52) U.S. Cl. ...................................... 375/259
(58) Field of Classification Search .......... 375/219, 375/222, 259, 377; 370/229–230, 235, 252, 370/236.1
See application file for complete search history.

(56) References Cited

U.S. PATENT DOCUMENTS 7,127,049 B2 * 10/2006 Godse et al. ............... 379/93.28
7,619,965 B2 * 11/2009 Kobayashi et al. ........... 370/217
(Continued)

FOREIGN PATENT DOCUMENTS

EP          1 701 478           9/2006
KR     10-2003-0064722 A       8/2003
(Continued)

OTHER PUBLICATIONS

Zahariadis et al., "A Comparison of Competing Broadband In-Home Technologies", Electronics & Communication Engineering Journal, Aug. 2002.
Husain et al.: "Remote Device Management of WiMAX Devices in Multi-Mode Multi-Access Environment", Broadband Multimedia Systems and Broadcasting, Mar. 31, 2008.
(Continued)

*Primary Examiner* — Jean B Corrielus
(74) *Attorney, Agent, or Firm* — The Farrell Law Firm, P.C.

(57) ABSTRACT

Disclosed are a system and a method for controlling wireless network access information in using a removable external modem. These relates to a case where a removable external modem among devices for a wireless access server (e.g. WiMAX) is connected with a host customer electronics (CE) device so as to be used. Particularly, in a case where the removable external modem, which has no information for accessing a specific network, e.g. operator Lock, a roaming list, a credential, operator ID, etc., when it is introduced, receives network access information through initial access, registration, and provisioning step, and is connected to other device to be used, the modem can be directly connected to a network of an existing registered network communication provider without a separate supplementary registration or a provisioning step.

23 Claims, 7 Drawing Sheets

U.S. PATENT DOCUMENTS

| | | |
|---|---|---|
| 8,059,530 B1 * | 11/2011 | Cole .............................. 370/229 |
| 2004/0047358 A1 | 3/2004 | Chen et al. |
| 2005/0198233 A1 | 9/2005 | Manchester et al. |
| 2005/0232175 A1 | 10/2005 | Draluk et al. |
| 2005/0243717 A1 * | 11/2005 | Stieglitz et al. ............... 370/229 |
| 2007/0106770 A1 * | 5/2007 | Alnas ............................ 709/223 |
| 2007/0136231 A1 * | 6/2007 | Padmanabhan ................... 707/2 |

FOREIGN PATENT DOCUMENTS

| | | |
|---|---|---|
| WO | WO 01/24473 A1 | 4/2001 |
| WO | WO 2008/150145 A2 | 12/2008 |

OTHER PUBLICATIONS

"WiMAX Forum Network Architecture (Stage 2 and Stage 3: Detailed Protocols and Procedures) WiMAX Over-The-Air Provisioning & Activation Protocol based on OMA DM Specifications), Release 1.5, Version 1.0.0", Mar. 26, 2008.

* cited by examiner

SYSTEM AND METHOD FOR CONTROLLING WIRELESS NETWORK ACCESS INFORMATION IN USING REMOVABLE EXTERNAL MODEM

PRIORITY This application claims priority to Korean Patent Application Serial No. 10-2007-0056344, filed Jun. 8, 2007, and to International Application PCT/KR2008/003207, filed Jun. 9, 2008, the contents of each of which are incorporated herein by reference.

BACKGROUND OF THE INVENTION

1. Field of the Invention

The present invention relates to a system and a method for controlling wireless network access information in using a removable external modem.

2. Description of the Related Art

In conventional techniques, most devices which are used for accessing a network of a wireless communication provider, such as SKT, KTF, etc. so as to be provided with a voice service and a data service, are limited to a cellular phone or a PDA, and a modem is embedded therein. In this case, information for accessing a network exists within the cellular phone or the PDA, and there is no case where the modem is connected with another device so as to be used. Also, most wireless devices which do not use a Subscriber Identification Module (SIM) card are manufactured while having a structure capable of using a service of only a specific communication provider from an initial manufacturing procedure. Therefore, it is usual that the devices are produced while having information for accessing the network of the specific communication provider, which has been inputted therein during manufacturing of the device at a factory. Meanwhile, in a case of a device using a SIM card, it is usual to store information for accessing a specific network in the SIM card, but not in a device including a modem.

Also, in a case of external modems for a mobile communication data service, since most of such modems are manufactured for a specific communication provider, it is usual to produce modems having basic information for accessing a network, which has already been set at a factory.

However, a recent device can be connected with a plurality of CE devices which do not include a wireless modem through a removable external modem, so as to allow the CE devices to be provided with a wireless accessing service. Also, it is possible to access a plurality of mobile communication provider, and not one limited mobile communication provider. FIG. 1 is a view illustrating a case where a CE device accesses mobile communication networks different from each other.

With reference to FIG. 1, the CE device 2 can access a network 11 to 1N of any service provider through a modem connected therewith, but not a network of a specific service provider. The CE device 2 selects one network among a plurality of networks, which the CE device can access, is provided with information required for network accessing from the selected network through a provisioning procedure and uses related service by using this information. Then, the CE device 2 deletes provisioning information of the corresponding network when expiration or revocation of a contract with a service provider of the corresponding network occurs. The CE device 2 is connected with a network of other service providers so as to be provided with information required for network access through a provisioning procedure, and uses a related service. The provisioning information may include operator lock information, roaming list information, network access credential information, channel plan information, etc. If operator lock has not been set, it is possible to simultaneously make each contract with a plurality of communication providers, without a need for terminating a contract with one network service provider and to use corresponding network access service. At this time, the CE device has to undergo a provisioning procedure so as to receive required information from each network service provider.

However, in this provisioning procedure, it is possible to receive information required for network access by using a client existing in the CE device, but not in a wireless modem. For example, in a WiMAX, a provisioning procedure is performed through an OMA DM protocol, and in most of the cases, an OMA DM Client used as a provisioning client and a connecting manager (CM) for controlling a wireless modem exists in the CE device. Therefore, after data obtained through the provisioning procedure is received and stored in a main body of the CE device, the data is used for controlling a modem through the CM in a network accessing procedure. As a result, although a removable modem is connected with one CE device so as to undergo a provisioning procedure respective to a predetermined network, there is a disadvantage in that a separate provisioning procedure is also performed respective to the predetermined network, which has undergone the provisioning procedure, in a case where the modem is connected with another CE device.

SUMMARY OF THE INVENTION

Accordingly, the present invention has been made to solve the above-mentioned problems occurring in the prior art, and the present invention provides a system and a method for controlling wireless network access information when a removable wireless modem, which can access a network without a separate provisioning procedure, even through the wireless modem which has been connected with one CE device and has undergone a provisioning procedure at one time, is connected with a plurality of CE devices, which hasn't used in the provisioning procedure so as to access the network, is used.

In accordance with an aspect of the present invention, there is provided a system for controlling access information of a wireless network, the system including: a removable external modem; one network; and a first consumer electronics (CE) device, which obtains the wireless network access information in such a manner that the CE device is connected with the removable external modem so as to perform a provisioning procedure respective to the network, and transmits the wireless network access information obtained in the provisioning procedure to the removable external modem so as to allow the modem to store the information or obtains the wireless network access information stored in the removable external modem so as to use it in setting network access

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EXEMPLARY EMBODIMENT

Hereinafter, exemplary embodiments of the present invention will be described with reference to the accompanying drawings. Further, in the following description of the present invention, a detailed description of known functions and configurations incorporated herein will be omitted when it may make the subject matter of the present invention rather unclear.

The present invention relates to a case where a removable external modem among devices for a wireless access server (e.g. WiMAX) is connected with customer electronics (CE) so as to be used. Particularly, in a case where a removable external modem, which has no information for accessing a specific network, e.g. an operator lock, a roaming list, a credential, operator ID, etc., when it is introduced, receives network access information, i.e. wireless network access information, through initial access, registration, and a provisioning step, and is connected to other device to be used, the present invention relates to an device for directly connecting the removable external modem to a network of an existing registered network communication provider without a separate supplementary registration or a provisioning step.

Firstly, with reference to FIG. 2, the basic concept of a system, which is achieved by the present invention, will be described below.

Figure 1:
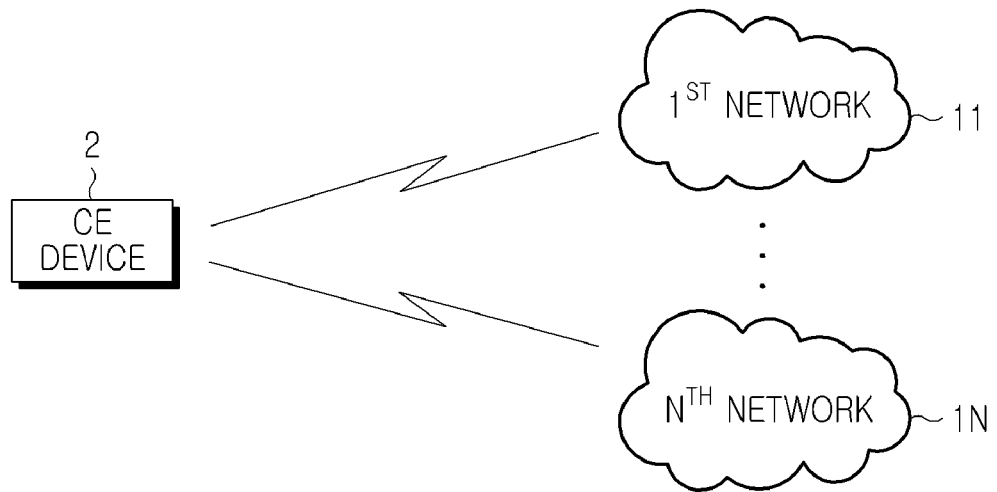
FIG. 1 is a view illustrating a case where a CE device is connected with mobile communication networks different from each other.
Figure 2:
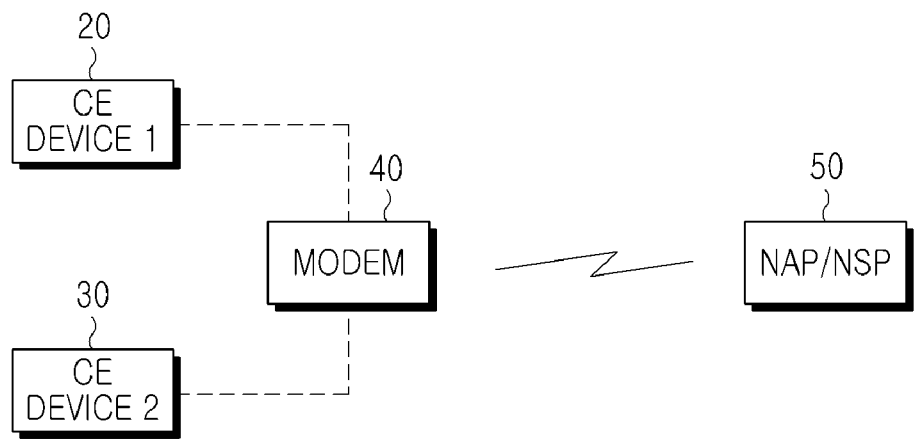
FIG. 2 is a view illustrating a basic concept according to the present invention.

FIG. 2 is a view illustrating a basic concept of the present invention. With reference to FIG. 2, a CE device 1 20 can access a specific network, i.e. network access provider/network service provider, through a removable external modem 40.

When one CE device 1 20 is registered in a network 50 of a wireless provider and finishes g performing a provisioning step through the removable external modem 40, in a case where the CE device 1 20, which has been used in provisioning, is removed, and other CE device 2 30 is connected with the removable external modem 40, the device 2 30 can access the network 50 so as to use related services, even though the provisioning procedure respective to the network 50 of the specific wireless communication provider isn't performed again.

In order to achieve this, when the one CE device 1 20 receives information required for accessing a network through the removable external modem 40 connected with the CE device 1 20 in a case where one CE device 1 20 is registered in the network 50 of the specific wireless communication provider, the present invention stores the information required for accessing the network in the removable external modem 40. Then, when the CE device 2 30 is connected with the removable external modem 40 storing the information required for accessing the network, the CE device 2 30 reads the information required for accessing the network from the removable external modem 40 and uses it in setting the CE device 2 30, similarly to the state where it has undergone provisioning. Therefore, the CE device 2 30 can access the network 50 of the specific wireless communication provider and provide related services without a need for undergoing provisioning from the network of the specific wireless communication provider.

According to an embodiment of the present invention, the information required for accessing the network can be transmitted from the network of the specific wireless communication provider to the device through a Device Management (DM) protocol. In this case, the network is operated as a DM server, and the device is operated as a DM client.

The DM is a standard protocol defined in a DM working group existing in an Open Mobile Alliance (OMA), which is a mobile standardization organization. According to the DM of the OMA, the DM server controls firmware, software, parameters, schedules, etc. which formes a plurality of DM clients in a wireless environment. In order to achieve this, the DM server needs to define an object to be a mediator for setting and controlling a terminal. The object refers to a management object (hereinafter, referred to as an MO). The MO is defined as data which the DM server and the DM client need to hold in common, and in order to achieve easy understanding, parameters are shown as a data structure in a tree shape.

Figure 3:
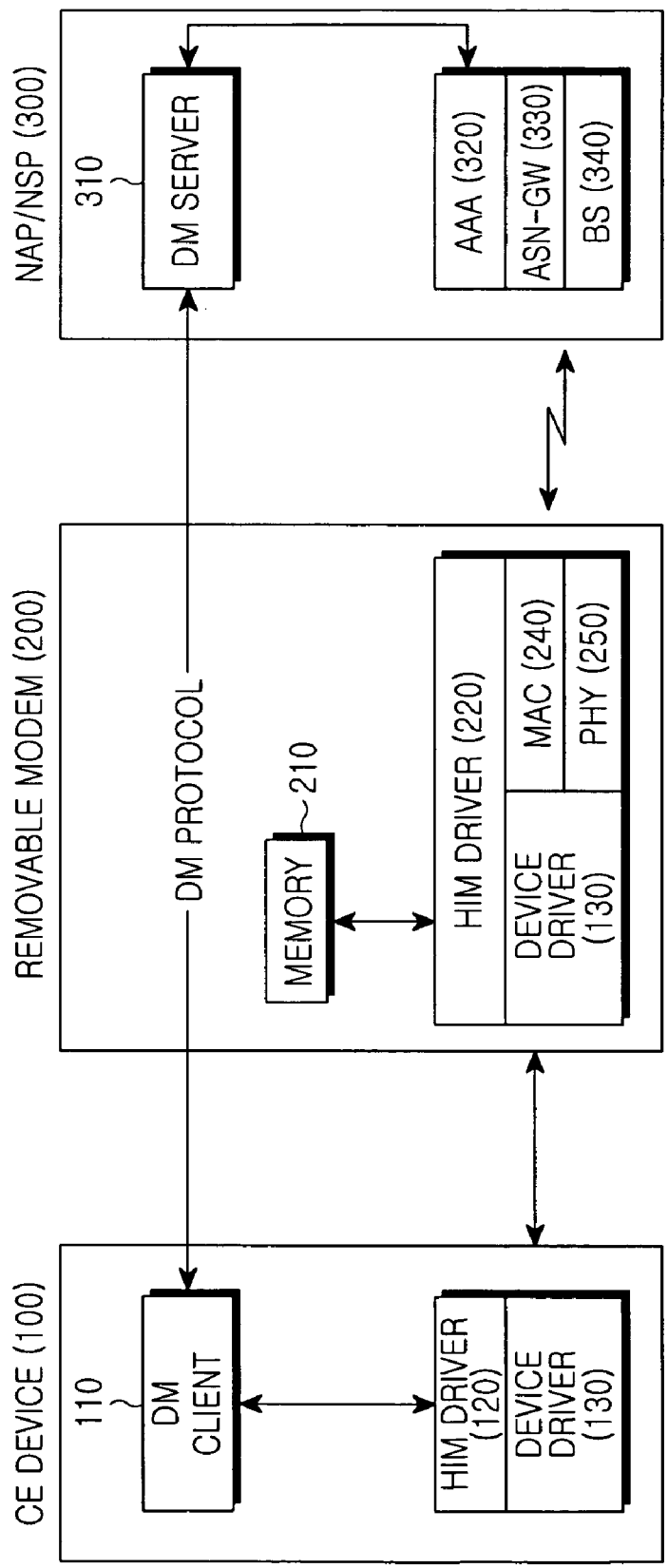
FIG. 3 is a view illustrating a system for controlling access information of a wireless network according to an exemplary embodiment of the present invention.

FIG. 3 is a view illustrating a system for controlling access information of a wireless network according to an exemplary embodiment of the present invention.

With reference to FIG. 3, the system for controlling access information of a wireless network includes a CE device 100, a removable external modem 200, and Network Access Provider/Network Service Provider (NAP/NSP) 300.

Any kind of device, which can access the NAP/NSP in such a manner that the removable external modem 200 are assembled, can be the CE device 100. The CE device 100 may be a typical cellular phone, PDA, Laptop, PC, UMPC, PMP, MP3P, etc., but isn't limited to these. According to an exemplary embodiment, the CE device 100 includes the DM client 110 so as to interface the DM server 310 included in the NAP/NSP 300 through the DM protocol.

Also, the CE device 100 includes a driver module, e.g. a driver 120 and a typical device driver 130, which satisfies a protocol for controlling the removable external modem 200 assembled therewith.

The removable external modem 200 includes a device driver 230 included in a typical modem, a MAC level 240, and PHY level 250. Also, the removable external modem 200 includes a HIM driver 220 so as to be controlled by the CE device 100 through a HIM protocol. Also, the removable external modem 200 is connected with a host device, i.e. the CE device 100 so that it can read and write, and includes a memory 210, in which stored information isn't lost even if the memory is separated from the CE device 100, e.g. a flesh memory. The removable external modem can be connected with the CE device by various wire/wireless accessing means. The accessing means can be a USB, a Personal Computer Memory Card International Association (PCMCIA), Ethernet, and Bluetooth, but isn't limited to these.

The NAP/NSP 300 includes the DM server 310 so as to be connected with the DM client 110 of the CE device 100 through a DM session. Also, the NAP/NSP 300 includes an AAA 320, an Access Service Network Gateway (ASN-GW) 330, a BS 340, etc. The AAA 320 performs authentication, authorization, and accounting respective to the CE device 100. ASN-GW 330 allows the CE device 100 to access other entities providing network service. The BS 340 is wirelessly connected with the CE device 100 so as to transmit/receive data and a signal.

The CE device accesses the NAP/NSP 300 through the removable external modem 200 so as to receive provisioning information required for network access, and uses related service based on this information. At this time, according to an exemplary embodiment of the present invention, the DM client 110 of the CE device 100 receives provisioning information required for network access from the DM server 310 of the NAP/NSP 300 through the DM protocol. The CE device 100 controls the received provisioning information so as to access a network registered in the removable external modem through the HIM protocol, and simultaneously can transmit provisioning data to the removable external modem 200 so as to store in the memory 210 included in the removable external modem 200.

Then, even if the removable external modem 200 is connected with another CE device which hasn't been used in provisioning, the CE device connected with the removable external modem 200 reads provisioning data required for network access stored in the memory 210 of the removable external modem and uses it in a state similar to a state of the CE device having undergone provisioning from the NAP/NSP. Therefore, the CE device can access the corresponding network and use related services.

As such, the CE device 100 connected with a predetermined modem obtains information required for communication with the NAP/NSP 300, i.e. a network of a specific wireless communication provider through the DM session, and stores the information in the removable external modem 200. In a case where the removable external modem 200 is connected with other host device, but not a host device connected when it is registered in a network, the other host device reads information required for network access, which has been stored in the removable external modem 200. Therefore, even through a host device of the modem is replaced, in a case where a modem registered in the network is used, it is possible to always access an identical wireless communication provider without a separate registration process or a provisioning process.

Figure 4:
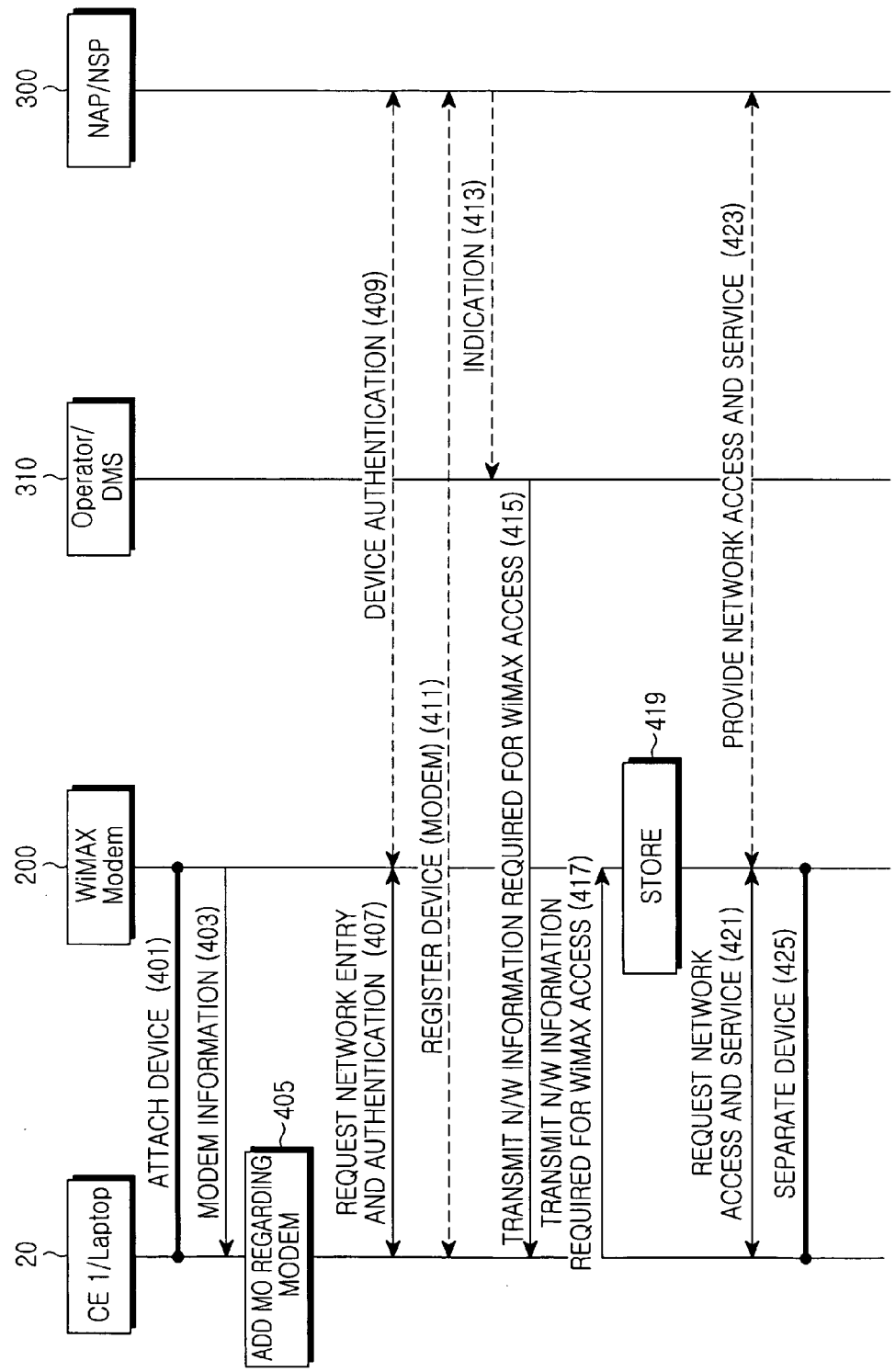
FIG. 4 is a view illustrating a flow of messages between a CE device and a removable external modem when the removable external modem is initially connected with a predetermined network.
Figure 5:
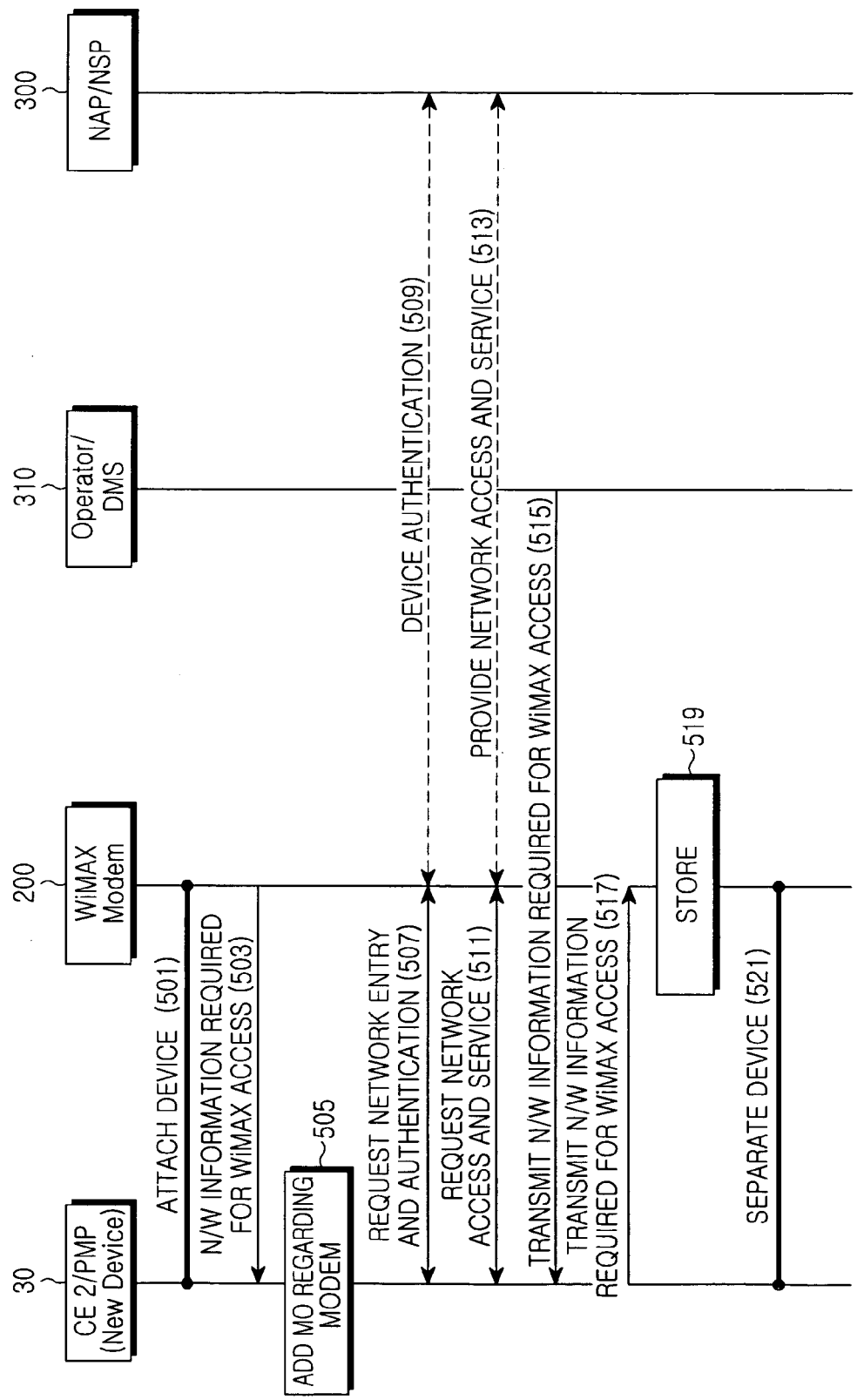
FIG. 5 is a view illustrating a flow of messages between a CE device and a removable external modem after the removable external modem is registered in a predetermined network.

FIGS. 4 and 5 are views illustrating a flow of messages between the CE device and the removable external modem. FIG. 4 is a view illustrating flow of messages between the CE device and the removable external modem when the removable external modem is initially connected with a predetermined network. FIG. 5 is a view illustrating a flow of messages between new CE device and the removable external modem after the removable external modem is registered in the a predetermined network and undergoes provisioning.

Meanwhile, in the embodiment, a WiMAX serve is illustrated as an example, and it is understood by those skilled in the art that the present invention can be applied to any type of communication service.

According to the present invention, the CE device 1 is connected with the removable external modem so as to access the NAP/NSP, is registered in a corresponding NAP/NSP according to a registration procedure, receives corresponding NW access information, etc., and accesses an NW by using the NW access information so as to use services. At this time, in a case where the removable external modem is separated from the CE device 1 and is connected with another CE device 2, e.g. a PMP, so as to use services, the removable external modem can directly use a service without a separate registration procedure according to the object achieved by the present invention.

With reference to FIG. 4, the CE device 1 20, e.g. a laptop computer, is connected with the removable external modem 200, which isn't registered in a predetermined network in step 401 and doesn't have a setting parameter, such as credentials, a roaming list, etc. for accessing the network. The removable external modem 200 can be connected with the CE device 1 20 by an accessing means, such as a USB, Personal Computer Memory Card International Association (PCMCIA), Bluetooth, Ethernet, etc.

Accordingly, the CE device 1 20 detects connection with the modem, and then reads modem information from the modem in step 403. At this time, the modem information is required for an MO tree regarding the modem according to an exemplary embodiment of the present invention. Such modem information can include a MAC address, H/W and F/W versions, a manufacturer, a model type, a serial number, operator lock information, etc. of a modem, but isn't limited to these. Among such modem information, the MAC address, the manufacturer, the model type, the serial number, etc., has to be stored in an area which can not be changed according to conditions regarding access of a network.

Figure 6:
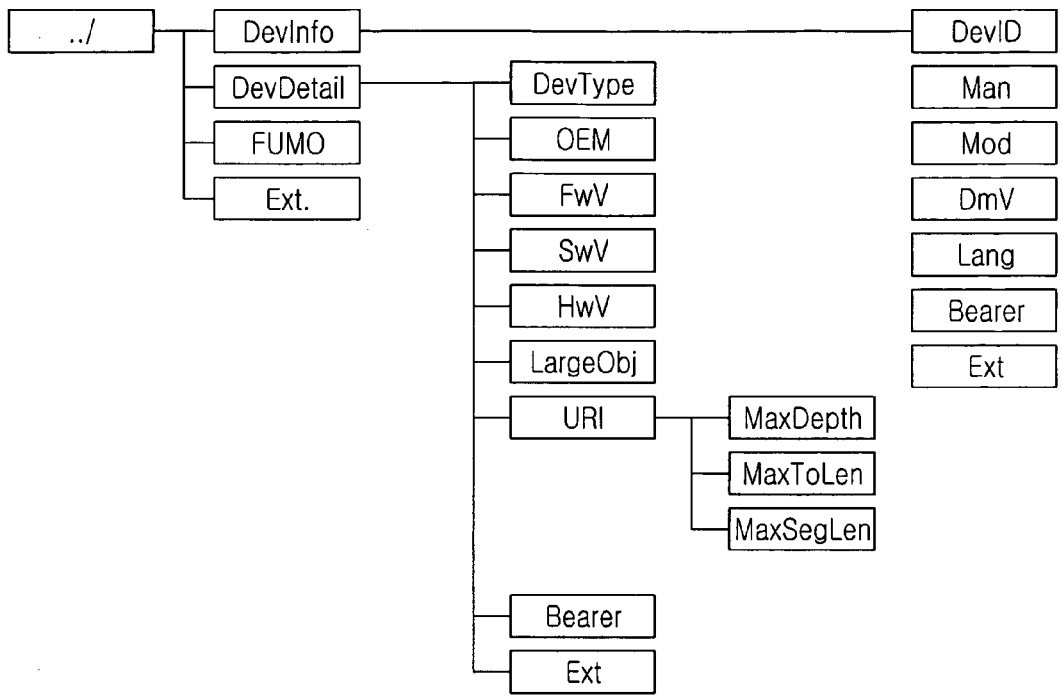
FIG. 6 is a view illustrating one embodiment of an original MO tree of a CE device.
Figure 7:
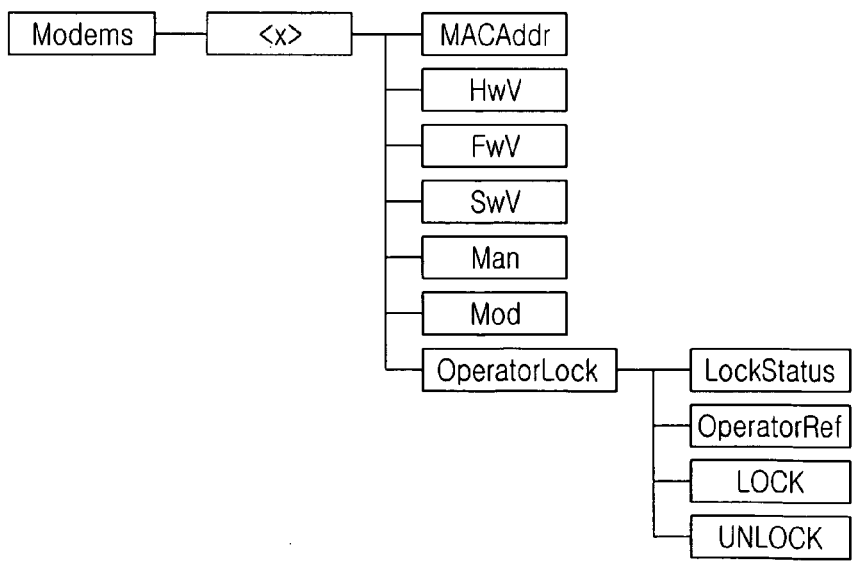
FIG. 7 is a view illustrating an MO tree regarding a modem to be added to an MO tree of a CE device.
Figure 8:
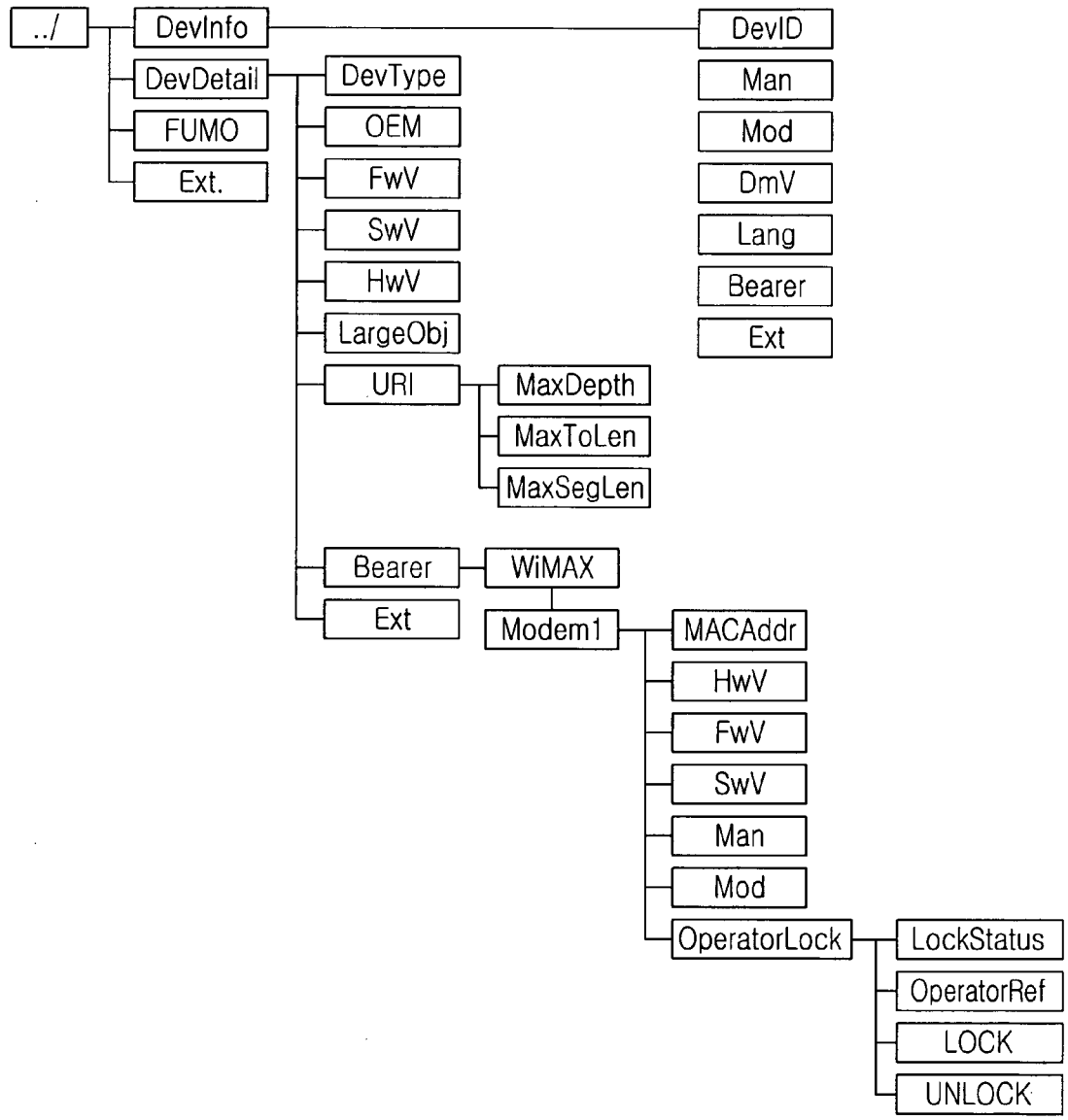
FIG. 8 is a view illustrating an MO tree after a removable external modem is connected with a CE device.

The CE device 1 20 reads corresponding modem information and constructs an MO regarding the modem in an MO tree of the CE device, which the DM client 110 already has, by using the corresponding modem information in step 405, and adds it to the MO tree of the CE device. Therefore, after the removable external modem is connected, the DM client 110 has to have modem information as well as information regarding a host CE device in its own MO tree. FIG. 6 is a view illustrating an embodiment of an MO tree of a CE device before a wireless modem is connected. FIG. 7 is a view illustrating an embodiment of an MO tree regarding a modem, which is stored when the movable external modem is manufactured. FIG. 8 is a view illustrating a completed MO tree of the DM client 110 after the removable external modem is connected with the CE device. Although modem information is shown in MO tree form in FIG. 7, it doesn't need to have an MO tree-form when it is stored within the modem. There is no problem with the modem information storing only related information allowing an MO tree regarding the modem to be formed in such a manner that the modem information is transmitted to the CE device, in which the DE client exists. Also, the modem information, which has been stored in the removable external modem, may be a text file of a Tree and Description Serialization (TNDS) type constituted of XML, and may also be a binary type-compressed file so as to increase efficiency in using storage. The TNDS is an MO tree with as an XML structure or a WBXML structure.

In a case where the modem information is a binary-type file, when a modem is connected with the CE device 1 20, it is necessary that the CE device 1 20 releases compression of the binary-type file and converts it to a text file of an XML type, and the DM client 110 reads XML information so as to generate an MO. In addition, the modem information can be stored while having a predetermined type, which can indicate corresponding information.

The CE device 1 20 accesses the NAP/NSP 300 through interface with the external modem 200 so as to perform an authentication process. That is, the CE device 1 20 requires a network entry and an authentication from the modem 200 in step 407, and the modem 200 responds to the requirement for the network entry and the authentication so as to perform an authentication process respective to the NAP/NSP 300 in step 409. Since the entry and the authentication processes are performed according to a conventional technique, the detailed description of them will be omitted in the present invention.

Subsequently, a user of the CE device 1 20 registers a modem connected with the CE device 1 20 in the NAP/NSP 300 in step 411. Registration can be achieved through a process where information of CE device 1 20 and the modem 200 is transmitted or inputted to a subscription portal operated by an operator of the NAP/NSP 300.

When successful registration is completed, the NAP/NSP 300 directs the DM server 310 to perform bootstrapping and provisioning respective to a corresponding device in step 413.

Accordingly, after the DM server 310 DM performs bootstrapping respective to the corresponding device and gives the device an access authority respective to the DM server 310, the DM server 310 is provided with access information of a N/W, which is required for WiMAX accessing, e.g. roaming list, an authentication credential, operator Lock information, a channel plan, information regarding subscriber, etc., through DM session. At this time, the entity in charge of provisioning is the DM server 310 of the NAP/NSP and the DM client 110 within the CE device 10. Therefore, all pieces of provisioning information are transferred to the DM client 110 within the CE device through the modem 200, but not to the modem 200. At this time, the provisioning information is transferred through the DM session. The CE device 10 generates an MO regarding network access information by using this provisioning information, and adds the MO to its own MO tree so as to complete an MO tree shown in FIG. 9. The detail structure of the MO tree can be changed according to each situation.

When the provisioning has been completed, the provisioning information is used in controlling the modem 200 through the CM. Therefore, in order to allow the modem to access a network through an identical setting, even though the modem is connected with other CE device, the CE device 1 20 transmits a message allowing corresponding provisioning information to be transmitted to the modem 200 and stored in step 417. The type of data transmitted in the procedure can be any type, such as document of XML TNDS, which describes an MO tree structure, a compression file of the document, or a format having a predetermined structure, which can indicate corresponding information.

At this time, in a case where a value, which directly adjusts a setting value of a modem, is included in provisioning data, particularly, in a case where the setting value of the removable external modem, such as the channel plan, has to be set differently from a current value, the CE device 1 20 delivers a demand to the modem through the HIM protocol so as to directly convert a corresponding setting value.

The removable external modem 200 receives a corresponding message in step 419, and stores it in a storage, which the modem can access through the CE device, e.g. a flesh memory. The CE device 1 20 requests network access and service from the NAP/NSP 300 via the removable external modem 200 in step 421. Accordingly, the NAP/NSP 300 allows network access and provides services to the 20 CE device 1 20 through the removable external modem 200 in step 423.

That is, the CE device 1 20 gives a controlling demand to the modem by using provided setting values through the provisioning procedure so that the CE device can access a corresponding network to be provided with a desired service, and finishes the operation of accessing the network after completing use of the service.

Afterward, the WiMAX modem 200 is separated from the CE device 1 20 in step 425. When the WiMAX modem 200 has been separated, the DM client 110 deletes or inactivates a part of the MO tree, which relates to the corresponding modem. In this case, the MO tree is restored to an MO tree in a previous state where the modem isn't connected as shown in FIG. 6.

Subsequently, with reference to FIG. 5, the flow of messages in a case where another CE device is connected with the WiMAX modem 200 will described. With reference to FIG. 5, the WiMAX modem 200 registered in the NAP/NSP 300 is connected with another CE device 2 30, e.g. a PMP, but not the CE device 1 20, in step 501. Similarly to the case shown in FIG. 4, the WiMAX modem 200 can be connected with the CE device through a mediator, such as a USB, PCMCIA, Bluetooth, Ethernet, etc.

The new CE device 2 30 recognizes connection with the WiMAX modem 200 and reads modem information and provisioning data, which have been stored in the WiMAX modem 200, from a predetermined storage 210 of the WiMAX modem 200 in step 503. At this time, if the modem information and provisioning data have been compressed into a binary type in a storing process, the CE device 2 30 again releases the compression of them.

After the CE device 2 30 reads the modem information and provisioning data, the CE device 2 30 adds an MO indicating the modem information and provisioning data to an MO tree of a CE device, which the DM client 110 already includes, so as to complete the MO tree in step 505.

Figure 9:
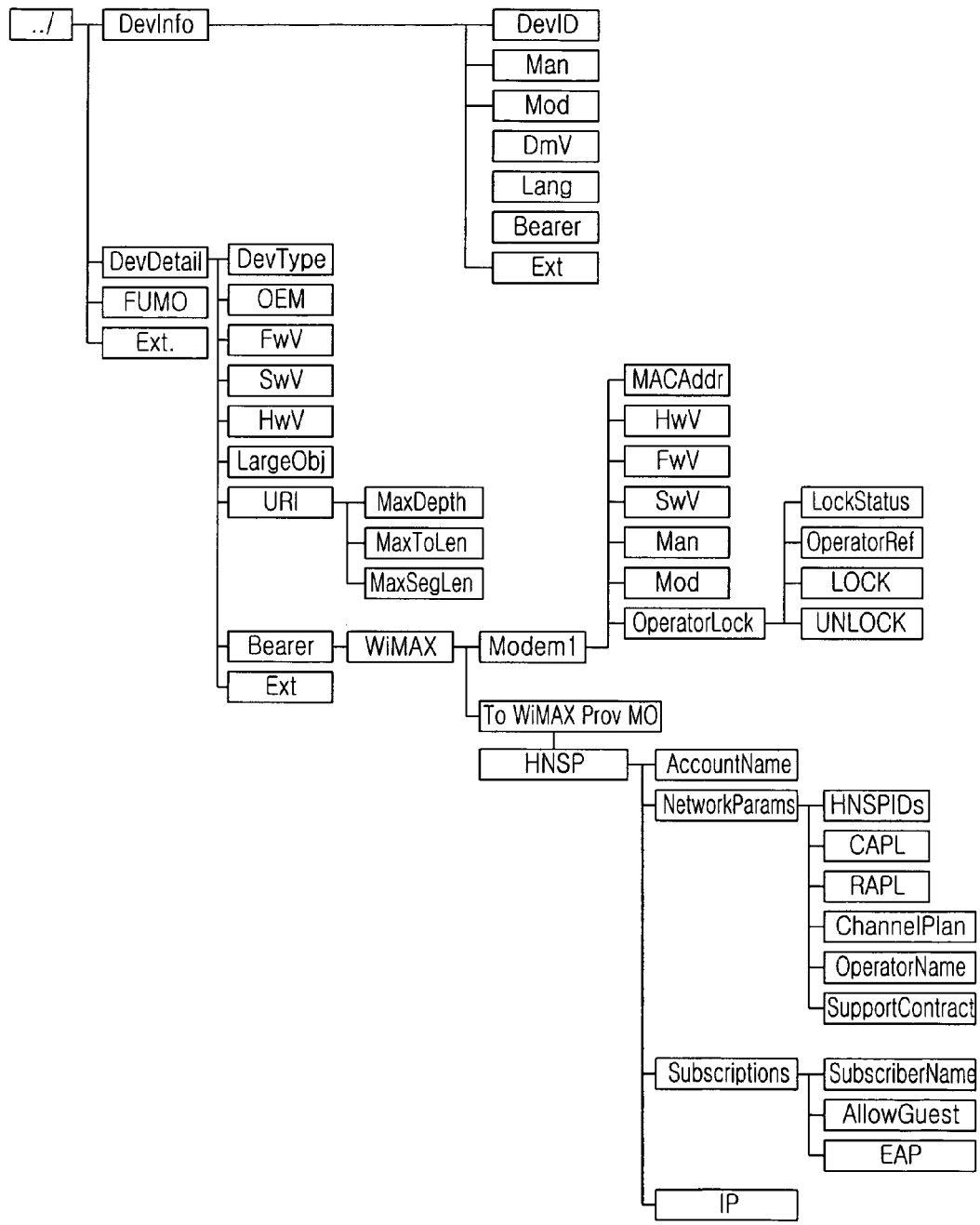
FIG. 9 is a view illustrating an MO tree including MO trees regarding provisioning information.

In this case, the MO tree has a shape shown in FIG. 9 in such a manner that MOs for provisioning data are added thereto. 9. At this time, in comparison with the MO tree of the CE device 1 20, MOs regarding the CE device are different so that a part of the MO tree, which relates to CE device information, such as DevInfo, DevDetail, etc. within the MO tree, has a value different from a corresponding value of the MO tree of the CE device 1.

Then, similarly to the case shown in FIG. 4, the device 2 30 accesses the NAP/NSP 300 through the WiMAX modem 200 and performs an authentication process in steps 507 and 509. At this time, since information for network access has been already provided, stored in the WiMAX modem, and transmitted to the new CE device, if the information is used, it can be recognized that the device and the user have been already registered. In this case, DM bootstrapping and provisioning processes aren't performed.

Subsequently, the CE device 2 30 accesses the network by using network access information included in information obtained by reading the WiMAX modem 200 and is provided with a desired service.

The CE device 2 30 can add, delete, and adjust data(MO) from the NAP/NSP 300 through the DM session, or release an operator lock in step 310 according to necessity. The procedure is performed between the DM server 310 and the DM client 110 of the CE device 2 30, and the structure or the value of the MO tree is changed.

As described above, the provisioning information is applied to the modem 200. Therefore, in order to make it possible for the modem 200 to access the network through an identical setting, even if it is connected with another CE device, the CE device 2 30 transmits a message for allowing the corresponding provisioning information to be delivered to the WiMAX 200 and to be stored therein in step 517. The type of data transmitted in the procedure can be any type, such as a document of a TNDS type, which describes an MO tree structure, a compression file of the document, or a format having a predetermined structure, which can indicate corresponding information. The removable external modem 200 receives the corresponding message, stores it in a storing area where it can access through the CE device 2 30 in step 519, and then removes the WiMAX modem in step 512. As described above, according to the present invention, the recent setting is applied to a modem, even if the modem is connected to any type of CE apparatus.

According to the present invention, there is a typical removable external modem, which can access any network according to a user's selection, but not a modem which can access a specific network since it has been manufactured. The EM client within the CE device as a host device transmits information regarding network provisioning data and lock data, which is received from the DM server of the wireless communication provider so as to be applied, to the removable external modem. After the removable external modem stores the provisioning data and the lock data in a storage of the modem, which can be accessed through the CE device, in a case where the modem is connected with new CE device, the network provisioning data and the lock data are read by the new CE device so as to be used for accessing a network. As a result, it is possible to use a work service through a modem, which has been registered one time, without a separate registration and a separate provisioning procedure, even though the modem is connected with any CE device.

The invention claimed is:

1. A system for controlling access information of a wireless network, the system comprising:
a removable external modem; and
a first Consumer Electronics (CE) device, configured to wirelessly receive wireless network access information from a network through the removable external modem by connecting with the removable external modem and performing a provisioning procedure respective to the network, and to transmit the wireless network access information received in the provisioning procedure to the removable external modem and allow the modem to store the information.

2. The system as claimed in claim 1, wherein the removable external modem is configured to access the network and includes a memory configured to store the received information and to retain the stored information when the modem is separated from the first CE device.

3. The system as claimed in claim 1, wherein the network includes a Device Management (DM) server, and the first CE device includes a CE client, wherein the wireless network access information is delivered from the network to the CE device through DM protocol.

4. The system as claimed in claim 3, wherein the first CE device generates a Management Object (MO) regarding the wireless network access information and adds the generated MO to an MO tree of the first CE device.

5. The system as claimed in claim 1, further comprising a second CE device configured to reads the wireless network access information stored in the removable external modem, and to use a service of the network without a separate provisioning procedure respective to the network when the second CE device is connected with the removable external modem.

6. The system as claimed in claim 1, wherein the wireless network access information includes a text file of a Tree and Description Serialization (TNDS) type, which is constituted of Extensible Markup Language (XML), and is stored in the removable external modem.

7. The system as claimed in claim 1, wherein the wireless network access information includes a binary-type compressed file and is stored in the removable external modem.

8. The system as claimed in claim 5, wherein the wireless network access information is a binary-type compressed file and is stored in the removable external modem, and the second CE device releases the compression of the binary-type file and converts the file to a text file of an Extensible Markup Language (XML) type, when the wireless network access information as the binary-type compressed file is stored in the removable external modem.

9. The system as claimed in claim 6, wherein the second CE device generates a Management Object (MO) regarding the wireless network access information by using the wireless network access information.

10. The system as claimed in claim 1, wherein, when the first CE device is connected with the removable external modem, the first CE device reads modem information from the removable external modem, generates a Management Object (MO) regarding the modem, and adds the generated MO regarding the modem to its own MO tree.

11. The system as claimed in claim 10, wherein, when the removable external modem is separated from the first CE device, the first CE device deletes the MO regarding the modem from the MO tree or inactivates the MO.

12. The system as claimed in claim 4, wherein when the removable external modem is separated from the first CE device, the first CE device deletes the MO regarding the network access information from the MO tree or inactivates the MO.

13. A method for controlling access information of a wireless network in a system including a removable external modem, a network, a first Consumer Electronics (CE) device, a second CE device, the method comprising the step of:
wirelessly receiving, by the first CE device, the wireless network access information, from the network through the removable external modem, by connecting with the removable external modem and performing a provisioning procedure respective to the network; and
transmitting, by the first CE device, the wireless network access information to the removable external modem and allowing the modem to store the information.

14. The method as claimed in claim 13, wherein when wirelessly receiving the wireless network access information, the network includes a Device Management (DM) server, and the first CE device includes a DM client so that the wireless network access information is received from the network through DM protocol.

15. The method as claimed in claim 13, wherein the first CE device generates a Management Object (MO) regarding the wireless network access information and adds the generated information to its own MO tree.

16. The method as claimed in claim 13, further comprising:
reading, by the second CE device, the wireless network access information stored in the removable external modem when the second CE device is connected with the removable external modem; and
using, by the second CE device, a service of the network without a separate provisioning procedure respective to the network.

17. The method as claimed in claim 13, wherein the wireless network access information is a text file of a Tree and Description Serialization(TNDS) type, which is constituted of Extensible Markup Language (XML), and is stored in the removable external modem.

18. The method as claimed in claim 13, wherein the wireless network access information is a binary-type compressed file and is stored in the removable external modem.

19. The method as claimed in claim 13, further comprising releasing, by the second CE device, compression of the binary-type file and converting the file to a text file of an Extensible Markup Language (XML) type, when the wireless network access information as a binary-type compressed file is stored in the removable external modem.

20. The method as claimed in claim 16, further comprising generating, by the second CE device, a Management Object (MO) regarding the wireless network access information by using the wireless network access information.

21. The method as claimed in claim 13, further comprising:
reading, by the first CE device, modem information from the removable external modem:
generating a Management Object (MO) regarding the modem: and
adding the generated MO regarding the modem to an MO tree of the first CE device. when the first CE device is connected with the removable external modem.

22. The method as claimed in claim 21, further comprising at least one of deleting, by the first CE device, the MO regarding the modem from the MO tree: and
inactivating the MO when the removable external modem is separated from the first CE device.

23. The method as claimed in claim 15, further comprising at least one of
deleting, by the first CE device, the MO regarding the wireless network access information from the MO tree: and
inactivating the MO when the removable external modem is separated from the first CE device.

* * * * *